United States Patent Office 2,709,918
Patented June 7, 1955

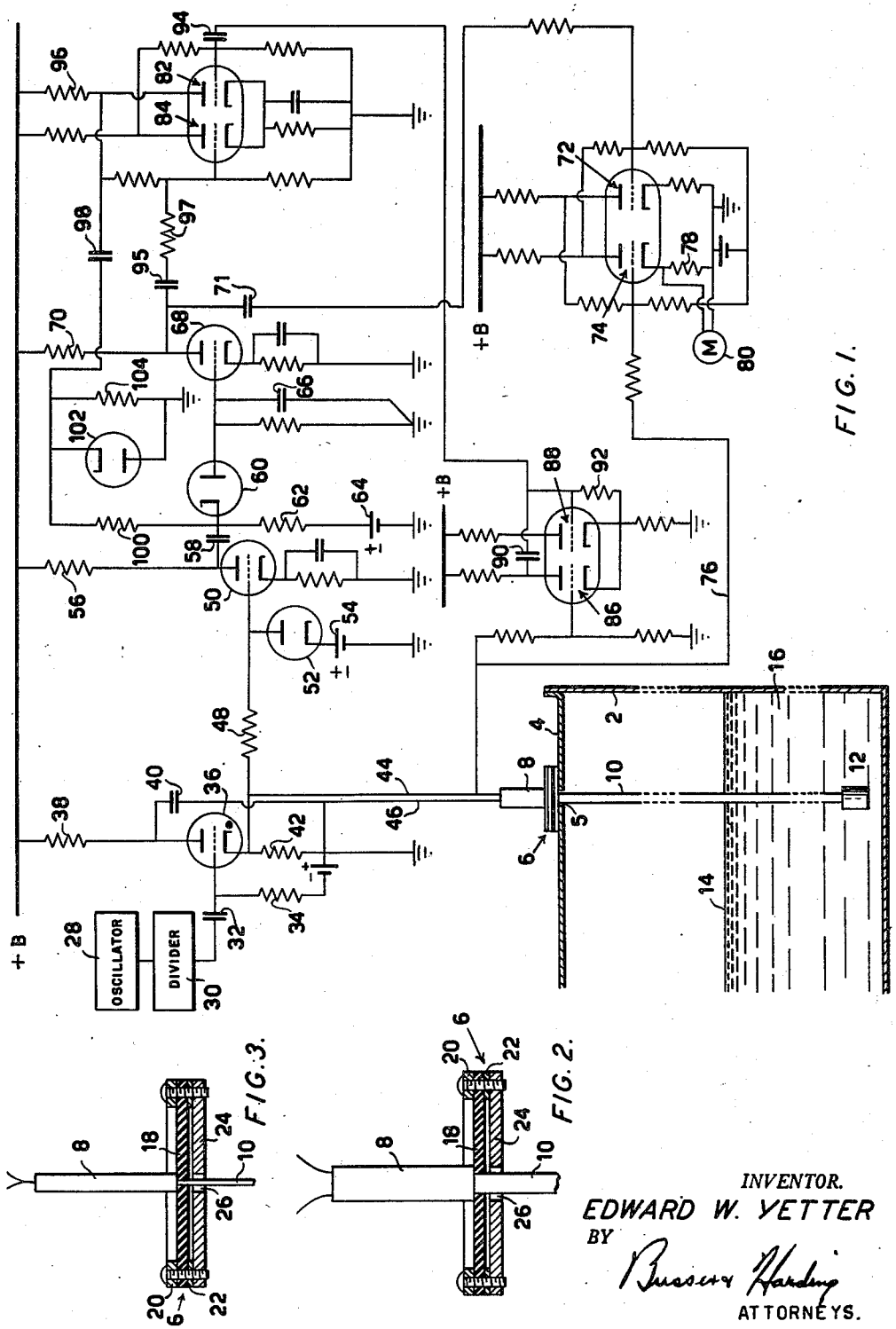

2,709,918

TANK GAUGE

Edward W. Yetter, Ardmore, Pa., assignor to Sun Oil Company, Philadelphia, Pa., a corporation of New Jersey Application January 17, 1950, Serial No. 139,105

9 Claims. (Cl. 73—290)

This invention relates to a gauge for determining liquid level in a receptacle or reservoir which, for convenience, will be hereinafter referred to as a tank though, as will appear, the invention is applicable quite generally to the determination of the position of the liquid.

In many cases, particularly where inflammable materials such as petroleum products are involved, complete tight closure of a tank is required to eliminate the hazard of leakage. Furthermore, when volatile liquids are involved the closed tanks containing them may be under substantial internal pressure. Furthermore, where highly inflammable liquids are involved safety regulations will not permit the introduction of electrical connections into a tank. For the foregoing reasons the gauging of liquid levels either by mechanical or electrical means is difficult to achieve.

Furthermore, telemetering of level indications is frequently desirable and this usually involves the necessity for rather complicated systems.

In accordance with the present invention there is provided a gauging means which can be used in conjunction with completely closed tanks with provision for telemetering to give level indications at remote points.

In brief, the invention involves the transmission of elastic disturbances along a conductor, such as a wire or tape, with reflection of the disturbances at the discontinuity provided by the passage of the conducting member through the surface of the liquid. An elastic disturbance originating at an end of the conducting member will be propagated therealong at a predetermined velocity and the reflection produced at the discontinuity is then detected, the total travel time being measured so as to give a measurement of the length of path of the disturbance from the source to the discontinuity and back to a detector which may be, though not necessarily, the same device which transmits the disturbance. In the preferred form of the invention a torsional disturbance is transmitted along a flat tape constituting the disturbance-conducting element. A single piezo crystal is used as both the source and detector. The disturbances are repeated at short intervals and the final measurement is made in the form of measurement of a current or potential, the average value of which is proportional to the level of the liquid.

The general objects of the invention indicated by the foregoing and specific objects relating primarily to details of the system which increase its accuracy of measurement will be apparent from the following description read in conjunction with the accompanying drawing in which:

Figure 1 is a diagram showing a preferred embodiment of the invention and illustrating a tank and associated parts in section as well as a wiring diagram of the electrical elements involved;

Figure 2 is a vertical section showing, in particular, the mounting arrangement for a transmitter-detector and a disturbance-carrying tape; and Figure 3 is a section similar to Figure 2 but taken at right angles thereto.

A tank illustrated at 2 is provided with a cover 4 provided with an opening 5 which is closed by a supporting assembly generally indicated at 6 mounting a transmitter-detector 8 and a metallic tape 10, the lower end of which supports a weight 12 to maintain a predetermined amount of tension in the tape. The tape extends downwardly into the liquid 16 in the tank through the surface 14 of the liquid, the level of which is to be measured.

Figures 2 and 3 illustrate details of the mounting 6. A rubber diaphragm indicated at 18 has molded into it the upper end of the tape 10, the upper end of which is secured to a crystal, the assembly of which is indicated at 8. The diaphragm 18 is clamped between a pair of rings 20 and 22 supported by a plate 24 secured to the top of the tank. The plate 24 is provided with a rectangular opening 26 to clear the tape, only a small amount of clearance being necessary. It will be noted, accordingly, that the plate 24 and the diaphragm 18 provide a complete closure over the opening 5 so that the contents of the tank are isolated from the atmosphere. The plate 24 serves, by reason of the small opening at 26, to protect the rubber diaphragm against damage due to sudden changes in pressure which may occur within the tank.

The tape 10 may be formed of various metals of spring type, such as, for example, spring steel or beryllium copper alloy. It has been found, for example, that a tape of approximately ¼ inch width and a thickness of 0.025 inch is satisfactory for this purpose, such a tape giving a reflection coefficient at an air-propane surface of approximately 5%. Such a tape, if made of steel, provides a velocity of propagation of the order of 2000 feet per second. The figures given, however, are merely illustrative and it will be evident that very considerable deviations from these figures are possible consistent with the securing of satisfactory results. Desirably, the tape is of small cross-section, of non-corrodible material, and of smooth surface to avoid changes in characteristics of propagation due to corrosion or deposit of gummy materials or dirt.

The crystal used may be of the well known twister type such as is commonly used for phonographic recording and reproduction. Since such crystals are well known they need not be described in detail and it will suffice to state that the crystal will, in response to an applied potential, give rise to a torsional disturbance in the tape and will, in response to a reflected torsional disturbance, give rise to an electrical output signal.

It will be evident that various equivalent types of transducers may be used, for example of electromagnetic or magnetostriction types. Furthermore, instead of using the same transducer for transmitting and receiving it will be clear that separate transducers may be used for these functions. However, there appears to be no particular advantage in using separate transducers.

It will also be evident that instead of utilizing torsional disturbances longitudinal or transverse disturbances may be used, transmitted and reflected through either wires or tapes. As will appear, the circuit arrangements which are provided will function equally well in conjunction with the various types of propagated disturbances when corresponding transducers are used. Both theory and practical results indicate, however, that optimum results may be effected when torsional disturbances are utilized and, accordingly, the following description will assume that such disturbances are involved.

The transmitted disturbance may be of various types, both periodic or aperiodic, but it has been found that best results are secured by shock excitation of the crystal giving rise to a damped periodic disturbance. The construction should, of course, be such that effective damping of the transmitter disturbance takes place in a period which is short compared with the minimum travel time of the disturbances from the transducer to the liquid surface and thence back to the transducer. A frequency of the periodic disturbance of upward of eight kilocycles may, for example, be used.

Referring now to the electrical parts of Figure 1 there is indicated at 28 an oscillator which may be of any desired constant frequency type such as a tuning fork or crystal oscillator. Generally such an oscillator, to maintain a fairly constant frequency, has a frequency too high for direct use and, accordingly, the frequency is lowered through the use of a frequency divider indicated at 30 which may take any of the well known forms to provide an output of controlled lowered frequency. This frequency is desirably of a number of cycles per second, the period being in excess of the travel time of the disturbance from the transducer back to the transducer for the lowest liquid level which is to be measured. In other words, the frequency which is provided by the divider depends upon the range of distances along the tape which are to be the subject of measurement.

The output of the divider 30 is delivered to the control grid of a thyratron 36 through a differentiating arrangement of a condenser 32 and resistance 34. A resistance 38 and condenser 40 are connected as illustrated to the anode of the thyratron 36, the condenser 40 discharging through the thyratron at the time of application of each positive pulse to the control grid, with resulting quenching action, the condenser being then recharged through the resistor 38 in preparation for the next firing. Pulses are delivered from across the cathode resistor 42 of the thyratron through the connections 44 and 46 to the crystal 8. Shock excitation of the crystal, accordingly, takes place with the excitation of a damped oscillatory disturbance at the upper end of the tape.

Positive pulses from the thyratron cathode are limited by the arrangement of resistance 48, diode 52 and battery 54 and are applied to the control grid of the amplifying triode 50 provided with an anode loading resistance 56. This arrangement is such that the amplifier is not overloaded by excessive signals from the thyratron cathode though, as will be apparent hereafter, the limiter is ineffective with respect to the reflected signals of comparatively small amplitude delivered to the grid of triode 50 from the crystal through the connection 44.

Rectification of the signals delivered from the anode of triode 50 through condenser 58 is effected by diode 60 and the carrier frequency components are filtered out by the condenser 66 leaving only the pulse envelope which is amplified and clipped by the triode 68 having an anode load resistance 70. A positive potential which may be adjusted is applied to the cathode of diode 60 by a battery 64, or its equivalent, through the resistance 62. This provides a threshold device which eliminates any signals of a voltage level less than that of the cathode of diode 60. Extraneous noise and multiple reflections are suppressed by this arrangement.

Signals from the anode of triode 68 are delivered through condenser 71 to trigger the tube 72 which is associated with a tube 74 in a conventional flip-flop arrangement. The grid of the tube 74, it will be noted, is connected to the cathode of the thyratron through connections 44 and 76 so as to be triggered by positive pulses at the cathode.

Passing for the present various additional circuit refinements it will now be seen that the original positive pulse at the thyratron cathode will render triode 74 conducting and triode 72 non-conducting by reasons of their interconnections. On the other hand, a reflected pulse which will provide a positive output at the anode of triode 68 will trigger the triode 72 rendering it conductive and the triode 74 non-conductive. The result is that current flow occurs periodically through the cathode resistor 78 of the triode 74, the flow taking place in each period for the interval between the emission of a disturbance to the tape and the reception of the reflected disturbance by the crystal. Accordingly, if the repetition frequency of the cycle determined by the frequency of firing of the thyratron 36 is constant and known and if the peak voltage across the cathode resistor 78 determined by the current through triode 74 is known and constant then the average potential across resistance 78 will be a direct measure of the travel time of the disturbance and, accordingly, of the disturbance to the surface 14 of the liquid. A potential measuring meter 80 is connected across the resistance 78 and furnishes the desired measurement provided the frequency of the cycle repetition is sufficiently high and the meter is sufficiently damped so that its indiacting element remains substantially fixed to indicate average potential. A recording meter may, of course, be provided to give a continuous record against time of variations of the liquid level.

It will be evident that for the purpose of telemetering a connection to a remote station may be provided at various points of the apparatus described. For example, the major part of the apparatus shown may be located locally with respect to the crystal 8 and the meter 80 connected remotely through a transmission line to this apparatus. On the other hand, the remote connection may be afforded by use of connections 44 and 46 as a remote transmitting line in which case the electrical apparatus may be distant from the tank. It will, of course, be evident that under these circumstances with a suitable switching arrangement the levels in any of a number of tanks may be read using the same electronic apparatus merely by connecting it selectively to individual crystals and tapes of the various tanks. In fact, in the case of a tank farm the electronic apparatus may be made portable and may be carried about to be plugged into crystal connections of individual tanks wherever level readings are desired.

Reference may now be made to certain refinements in the circuit illustrated. A suppression arrangement is provided to allow reception of signals only during the actual travel time of the measuring disturbances thereby rejecting other signals and minimizing troubles from spurious disturbances. In brief, the arrangement is such as to energize the amplifier beginning a short time after the initial transmission of the disturbance and ending immediately after reception of the first reflection. The initial delay is useful to remove the large transmitted pulse from the measuring portions of the circuit and to cut out spurious signals which are found to occur immediately after transmission due to resonances and imperfect impedance matching in the mount. The deenergization after reception of the reflected disturbance eliminates the effect of multiple reflections.

Triodes 82 and 84 are arranged in an Eccles-Jordan circuit. Control of this circuit is provided by a single shot multivibrator comprising the triodes 86 and 88 in a conventional circuit including the condenser 90 and resistance 92. The junction of these elements is connected to the grid of the triode 82 through the condenser 94. A connection through condenser 95 and resistance 97 is provided between the anode of triode 68 and the grid of triode 84. A condenser 98 is connected between the junction of the anode of triode 82 and its load resistance 96 and the cathode of diode 60 through resistance 100 and is also connected to ground both through the diode 102 and resistance 104 as shown.

Before the transmission of a pulse to the crystal from thyratron 36 the triode 88 is conducting and triode 86 is cut off. Triode 82 is conducting and triode 84 is cut off. Since triode 82 is conducting its anode is at low potential and the cathode of diode 60 is accordingly also at low potential so that negative signals may be transmitted through this diode to the triode 68. The positive transmitting pulse at line 44 will appear as a positive pulse at the grid of triode 84 and this triode will accordingly be rendered conducting and the triode 82 will become non-conducting. The result is that the potential of the anode of triode 82 will rise to a high positive value which is applied to the cathode of diode 60 resulting in the blocking of further signals to the triode 68. The amplifier is accordingly rendered inoperative by the first pulse appearing in the line 44 so that it will not transmit any immediate subsequent positive pulses in this line due to resonance, or the like. Diode 102 acts to clamp at ground potential the most negative portion of the rectangular wave generated at the anode of triode 82. This allows conduction through diode 60 during the time it is desired to allow the amplifier to receive signals, and prevent conduction at all other times. The positive swing of potential at anode 82 must, of course, be greater in amplitude than the greatest possible negative swing of any signal at the anode of triode 50.

The first positive transmitting pulse in the line 44 is also applied to the grid of the triode 86 which becomes conducting while the triode 88 becomes non-conducting. A negative pulse is emitted from the anode of triode 86 to the grid of triode 82 through the condenser 94. This, however, is without result since the triode 82 would simultaneously become non-conducting in any event at the same time as described above.

The single shot multivibrator provided by the triodes 86 and 88, however, will, after a delay, return to its initial condition, the delay depending upon the time constant of the circuit provided by the condenser 90 and resistance 92. When this restoration occurs, which occurrence should be before the reception of the earliest reflection which may be involved in the apparatus, a positive pulse is emitted from the anode of triode 86 to the grid of triode 82 which is rendered conductive while the triode 84 is rendered non-conductive. The result is that the high positive potential is removed from the cathode of diode 60 with restoration of the amplifier to condition to receive signals. The amplifier is thus rendered responsive to the first reflection.

When the first reflection is received there is again a positive pulse produced at the line 44. This again results in the application of a positive pulse to the grid of triode 84 with the result of rendering the amplifier inoperative as previously described so that only the first reflected pulse will be handled by the amplifier, later reflections being suppressed. The transmitting pulse is of much greater amplitude than the reflected pulse, and the multivibrator comprising tubes 86 and 88 is so constructed, by choice of circuit constants and potentials, that it is not actuated by the reflected pulse, but only by the transmitting pulse. The amplifier will, accordingly, remain inoperative until it is rendered operative following a delay after the occurrence of the transmitting pulse determined by the delay characteristic of the single shot multivibrator. The ultimate desired results are thus achieved: namely, suppression of any signals immediately following the occurrence of the transmitting pulse (whether this is, or is not, amplified) and suppression of signals immediately following the reception of the first reflection. The result is that current flows through cathode resistance 78 for a period in each cycle corresponding to the time between the transmission of a disturbance to the tape and the reception of the first reflection without the occurrence of any departure from this condition resulting from undesired signals, i. e., the flip-flop provided by triodes 72 and 74 is affected only by the initial transmitting disturbance and the first reflection.

It will be evident from the foregoing that what has been disclosed is applicable to the utilization of longitudinal or transverse vibrations as well as torsional vibrations for determining the location of a reflecting elastic discontinuity along a transmitter for an elastic disturbance.

What is claimed is:

1. Apparatus for the determination of liquid levels comprising a conductor of elastic disturbances extending through a liquid surface, said conductor being of non-circular cross-section, means for initiating an elastic torsional disturbance in said conductor at an unsubmerged point thereof, means for receiving a reflection of said elastic disturbance due to said surface, and means connected to both of aforementioned means for indicating the interval between the initiation of said disturbance and reception of said reflection.

2. Apparatus for the determination of liquid levels comprising a conductor of elastic disturbances extending through a liquid surface, said conductor being in the form of a metallic ribbon, means for initiating an elastic torsional disturbance in said conductor, means for receiving a reflection of said elastic disturbance due to said surface, and means connected to both of the aforementioned means for indicating the interval between the initiation of said disturbance and reception of said reflection.

3. Apparatus for the determination of liquid levels comprising a conductor of elastic disturbances extending through a liquid surface, said conductor being of non-circular cross-section, means for initiating an elastic torsional disturbance in said conductor at an unsubmerged point thereof, means for receiving a reflection of said elastic disturbance due to said surface, said means having a transducer in common for producing an elastic disturbance as the result of an electrical input and for producing an electrical output as the result of reception of an elastic disturbance, and means connected to both of the aforementioned means for indicating the interval between the initiation of said disturbance and reception of said reflection.

4. Apparatus for the determination of liquid levels comprising a conductor of elastic disturbances extending through a liquid surface, means for initiating a series of elastic disturbances in said conductor, means for receiving reflections of said elastic disturbances due to said surface, and means connected to both of the aforementioned means for indicating the series of intervals between the initiation of the disturbances and the reception of their corresponding reflections, the last mentioned means including a device for producing a series of pulses of substantially constant amplitude and each of a duration corresponding to one of said intervals, and a meter indicating the average value of said pulses.

5. Apparatus for the determination of liquid levels comprising a conductor of elastic disturbances extending through a liquid surface, said conductor being of non-circular cross-section, means for initiating a series of elastic torsional disturbances in said conductor, means for receiving reflections of said elastic disturbances due to said surface, and means connected to both of the aforementioned means for indicating the series of intervals between the initiation of the disturbances and the reception of their corresponding reflections, the last mentioned means including a device for producing a series of pulses of substantially constant amplitude and each of a duration corresponding to one of said intervals, and a meter indicating the average value of said pulses.

6. Apparatus for the location of an elastic discontinuity along a conductor of elastic disturbances comprising means for initiating a series of elastic disturbances in said conductor, means for receiving reflections of said elastic disturbances due to said discontinuity, the last mentioned means including an amplifier, means for desensitizing said amplifier for a period following initiation of a disturbance and preceding reception of its reflection, means for desensitizing said amplifier for a period following reception of the first reflection due to said discontinuity and at least until the occurrence of the next initiated elastic disturbance, and means receiving signals from said amplifier for indicating the series of intervals between the initiation of the disturbances and the reception of their corresponding reflections, the last mentioned means including a device for producing a series of pulses of substantially constant amplitude and each of a duration corresponding to one of said intervals, and a meter indicating the average value of said pulses.

7. Apparatus for the determination of liquid levels comprising a conductor of elastic disturbances extending through a liquid surface, means for initiating a series of elastic disturbances in said conductor at an unsubmerged point thereof, means for receiving reflections of said elastic disturbances due to said surface, the last mentioned means including an amplifier, means for desensitizing said amplifier for a period following initiation of a disturbance and preceding reception of its reflection, means for desensitizing said amplifier for a period following reception of the first reflection due to said surface and at least until the occurrence of the next initiated elastic disturbance, and means receiving signals from said amplifier for indicating the series of intervals between the initiation of the disturbances and the reception of their corresponding reflections, the last mentioned means including a device for producing a series of pulses of substantially constant amplitude and each of a duration corresponding to one of said intervals, and a meter indicating the average value of said pulses.

8. Apparatus for the determination of liquid levels comprising a conductor of elastic disturbances extending through a liquid surface, means for initiating a series of elastic disturbances in said conductor at an unsubmerged point thereof, means for receiving reflections of said elastic disturbances due to said surface, the last mentioned means including an amplifier, means for desensitizing said amplifier for a period following initiation of a disturbance and preceding reception of its reflection, and means receiving signals from said amplifier for indicating the series of intervals between the initiation of the disturbances and the reception of their corresponding reflections, the last mentioned means including a device for producing a series of pulses of substantially constant amplitude and each of a duration corresponding to one of said intervals, and a meter indicating the average value of said pulses.

9. Apparatus for the determination of the intervals between first and second signals of a repeated pair comprising an amplifier receiving said signals, means for desensitizing said amplifier for a period following the occurrence of each first signal and preceding occurrence of the following second signal, means for desensitizing said amplifier for a period following the occurrence of such second signal and at least until the occurrence of the next first signal, and means receiving signals, corresponding to said first and second signals, from said amplifier for indicating the series of said intervals, the last mentioned means including a device for producing a series of pulses of substantially constant amplitude and each of a duration corresponding to one of said intervals, and a meter indicating the average value of said pulses.

References Cited in the file of this patent

UNITED STATES PATENTS

| | | |
|---|---|---|
| 2,050,866 | Tamm | Aug. 11, 1936 |
| 2,277,110 | Johnson | Mar. 24, 1942 |
| 2,280,226 | Firestone | Apr. 21, 1942 |
| 2,439,130 | Firestone | Apr. 6, 1948 |
| 2,472,249 | De Giers et al. | June 7, 1949 |
| 2,477,370 | Hana | July 26, 1949 |
| 2,489,860 | Carlin | Nov. 29, 1949 |
| 2,490,452 | Mason | Dec. 6, 1949 |
| 2,494,990 | De Lano | Jan. 17, 1950 |
| 2,507,854 | De Lano | May 16, 1950 |
| 2,520,489 | Bergmar | Aug. 29, 1950 |
| 2,562,449 | De Lano | July 31, 1951 |
| 2,599,586 | Ross | June 10, 1952 |